United States Patent

Rambosek

[15] 3,635,848

[45] Jan. 18, 1972

[54] ISOCYANURATES, POLYISOCYANURATES AND POLYURETHANES AND THEIR PREPARATION USING AS A CATALYST A COORDINATION COMPOUND OF AN ORGANIC BORATE ESTER AND AN ALKALI OR ALKALINE EARTH METAL

[72] Inventor: George M. Rambosek, Maplewood, Minn.

[73] Assignee: Minnesota Mining and Manufacturing Company, St. Paul, Minn.

[22] Filed: July 10, 1969

[21] Appl. No.: 840,854

Related U.S. Application Data

[63] Continuation-in-part of Ser. No. 618,035, Feb. 23, 1967.

[52] U.S. Cl. .................... 260/2.5 AB, 252/182, 260/75 NB, 260/77.5 AB, 260/37 N
[51] Int. Cl. .................................... C08g 22/44, C08g 22/34
[58] Field of Search .................. 260/37 N, 248 NS, 77.5 AB, 260/2.5 AB, 75 NB, 77.5 AP; 252/182

[56] References Cited

UNITED STATES PATENTS

| | | | |
|---|---|---|---|
| 3,516,950 | 6/1970 | Haggis | 260/2.5 |
| 2,993,870 | 7/1961 | Burkus | 260/2.5 |
| 3,193,515 | 7/1965 | Mascioli | 260/2.5 |
| 3,284,413 | 11/1966 | Heiss | 260/77.5 |
| 3,454,533 | 7/1969 | Kerrigan et al. | 260/75 |

OTHER PUBLICATIONS

Hackh's Chemical Dictionary, 3rd ed., Blackiston, Philadelphia, 1944, p. 101.

*Primary Examiner*—Donald E. Czaja
*Assistant Examiner*—M. J. Welsh
*Attorney*—Kinney, Alexander, Sell, Steldt & Delahunt

[57] ABSTRACT

Isocyanates are trimerized, polymerized, or reacted with polyols, in the presence of a new catalyst comprising an organic borate ester and a base metal to produce isocyanurates, polyisocyanurates, urethane-modified polyisocyanurates, or isocyanurate-modified polyurethanes.

26 Claims, No Drawings

ISOCYANURATES, POLYISOCYANURATES AND POLYURETHANES AND THEIR PREPARATION USING AS A CATALYST A COORDINATION COMPOUND OF AN ORGANIC BORATE ESTER AND AN ALKALI OR ALKALINE EARTH METAL

This application is a continuation-in-part of my copending application, Ser. No. 618,035, filed Feb. 23, 1967.

This invention relates to a process for trimerizing mono-isocyanates or polyisocyanates to produce isocyanurates or polyisocyanurates. In another aspect, it relates to a process for reacting polyisocyanates with polyols to produce cross-linked isocyanurate-modified polyurethanes or urethane-modified polyisocyanurates having useful properties, such as relatively high temperature stability, hydrolytic stability, and high elongation. In a still further aspect, it relates to catalyst compositions useful in effecting polymerization or cure of isocyanates or polyisocyanate-polyol reaction mixtures.

The trimerization of aliphatic or aromatic mono-isocyanates, e.g., phenyl isocyanate, to produce isocyanurates is well known. A host of trimerization catalysts have been disclosed, used, or patented (see "Polyurethanes: Chemistry and Technology," Part 1, by J. H. Saunders and K. C. Frisch, Interscience Pub., New York (1962), p. 94, and U.S. Pat. Nos. 2,979,485, 2,993,870, and 3,381,008). Such isocyanurates or trimers are useful as chemical intermediates in the polymer art. Catalytic trimerization of polyisocyanates, including isocyanate-terminated prepolymers, to produce polyisocyanurates and urethane-modified polyisocyanurates is also known (see U.S. Pat. Nos. 2,965,614, 3,206,352, 3,211,704, and 3,280,066). Trimerization of isocyanates is especially of interest in urethane polymer chemistry to produce isocyanurate-modified polyurethanes and urethane-modified polyisocyanurates (see U.S. Pat. No. 3,168,483 and 3,179,626) or mixed polyurethanes—polyisocyanurates.

Though many of the catalysts disclosed as useful in the above-described prior art processes have merit, many of them have undesirable features. Tertiary amines generally have unpleasant odors which detract from their usefulness. Heavy metal catalysts are often toxic or leave toxic residues in the products resulting from their use. Xanthates contain sulfur and are capable of slowly decomposing giving rise to disagreeable odors. Other catalysts are corrosive and hazardous to use and many of the known catalysts are not active at room temperature or have very limited solubility in the reaction mixtures. Some catalysts are not applicable in the formation of foamed products. And many of the catalysts are limited in utility to production of products having limited physical properties.

Broadly speaking, I have discovered that isocyanates, including mixtures thereof with polyols, can be readily converted into isocyanurate products by catalyzing the trimerization of isocyanates with a base metal salt of an organic borate ester, such as the sodium salt of the tetraborate of triethylene glycol. By the practice of this invention, mono-isocyanates, such as phenyl isocyanate, can be trimerized to isocyanurate compounds and polyisocyanates, such as toluene diisocyanate, can be polymerized to form polyisocyanurates. Of particular importance, polyisocyanates, especially in the form of isocyanate-capped or terminated prepolymers, and polyisocyanates in admixture with polyols, such as polyalkylene ether glycols or hydroxy polyesters, can be polymerized readily in the presence of the catalyst of this invention to form cross-linked or cured isocyanurate-modified polyurethanes or urethane-modified polyisocyanurates (or mixed polyurethane-polyisocyanurates), which products have relatively high temperature resistance, hydrolytic stability, and are mechanically quite strong.

Generally catalysts of this invention do not have disagreeable odors and are not hazardous in use, nor do they leave highly toxic residues in the products formed. Some of these catalysts have the desirable property of being active upon admixture at room temperature with the isocyanate or polyisocyanate-polyol reactants and can be readily used in so-called "one-shot" applications. In the production of polymers with isocyanurate and urethane linkages, the catalysts have wide applicability and polymer products with different desirable properties, such as hardness, elongation, tensile strength, temperature stability and hydrolytic stability, can be produced from reaction mixtures having a wide range of NCO/OH equivalent ratios and such ratios do not have to be closely controlled to insure production of products with desirable properties. Polymer products with particular physical properties can be produced by selecting the proper NCO/OH ratio and it is not necessary in the production of many of such products to vary or change the type of polyol used in order to obtain such properties.

Depending on the degree of cross-linking and the distance between cross-links, the urethane-isocyanurate products of this invention can range from soft solids or rubbers to hard plastics or resins. Such products can be produced in nonporous form or in cellular or foamed form with open or closed cells, and can be either filled or nonfilled. Such products, depending upon their form, can be used as coatings, such as paving surfaces, waterproofing applications, and for decorative purposes. They are also useful as adhesives and as laminating resins. Structural or engineering products can also be formed from these products, for example, as a substitute for wood panels, walls, beams, etc. In general, these products can be used in various applications heretofore enjoyed by conventional polyurethanes, where their improved properties make them much more useful.

The catalysts of this invention are coordination compounds or complexes formed for example by admixing orthoborates derived from monohydric or polyhydric alcohols or ether alcohols or phenols with a base metal or compound thereof. As such, they can be considered as tetravalent compounds of boron in which the four ligands to boron are all unidentates, viz

where R and R′ are alkyl, ether-substituted alkyl, hydroxy-substituted alkyl, alkyl-substituted with ether and hydroxy substituents, or aryl, or in which at least one ligand is bidentate, viz

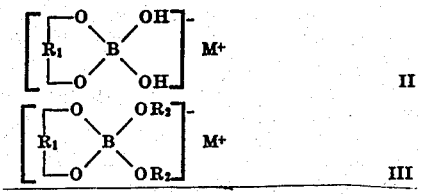

or the tetracovalent compound is composed of two bidentate ligands, viz

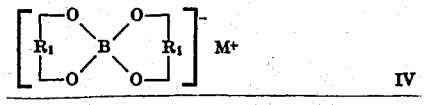

where each $R_1$ is the same alkylene, alkyleneoxy or arylene group, and $R_2$ is alkyl or aryl, and M is a metal cation of a monovalent or divalent alkali metal or alkaline earth metal. These coordination compounds can be prepared by reacting orthoborates of monohydric or polyhydric alcohols or phenols with a metal alkoxide or phenoxide, metal hydroxide, metal hydride, or base metal, or can be prepared directly by reacting the alcohol or phenol with a metal borohydride.

Many of the organic borate esters used as catalyst components in this invention are known (see "Organoboron Chemistry," Vol. 1, by H. Steinberg, Interscience Publishers, New York, 1964).

The borate ester precursors representatively include the simple orthoborates of monohydric or polyhydric alcohols (or alkanols) or ether alcohols or phenols. The trialkoxyboranes and triaryloxyboranes, B(OR)₃, where R is alkyl or aryl, such as methyl borate and phenyl borate, can be prepared by esterifying an alcohol or phenol with boric acid and removing byproduct water and carrying out the reaction in an excess of the alcohol and/or in the presence of an azeotroping solvent, such as benzene, toluene, or xylene. Alternatively, the alcohol can be reacted with boric oxide in the presence of an excess of alcohol, or again, if desired, in the presence of a hydrocarbon azeotroping agent. Another preparation involves transesterification of a lower borate ester, such as methyl borate, with a higher molecular weight alcohol. Alkyl and aryl borates are relatively hydrolytically unstable even in the presence of a small amount of water, and though they can be used in this invention if the reaction medium is kept anhydrous, they are not preferred in the practice of this invention.

Representative of the borates of monohydric alcohols and phenols which can be used to form the coordination compounds used as catalyst components in this invention include those where R in the formula B(OR)₃ is an alkyl, e.g., with one to 12 carbon atoms, such as methyl, ethyl, propyl, ethoxypropyl, hexyl, heptyl, octyl, nonyl, decyl, dodecyl, 2-methyl-4-pentyl, 2-ethylhexyl, 2-methyl-7-ethyl-4-undecyl, phenyl, lower alkyl-substituted phenyl, such as cresyl, cycloalkyl, such as cyclopentyl or cyclohexyl, lower alkyl-substituted cycloalkyl, such as 1-methylcyclohexylmethyl, and the like, preferably with each R being the same, as in trimethoxyborane.

Orthoborates of dihydric alcohol or phenol, used as precursors of the coordination compounds, can have different structures depending upon the molecular weight of the alcohol or phenol. Catechol and 1,2- and 1,3-glycols, such as ethylene glycol, propylene glycol, 1,3-propanediol, and pentaerythritol, have the biborate structure:

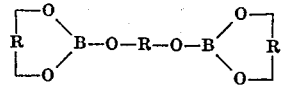

VI where R is phenylene, an alkylene or alkyleneoxy with two or three carbon atoms connected in a chain between the ring oxygen atoms. 1,4-Glycols, resorcinol, and those higher glycols where the two hydroxyl groups are separated by more than three carbon atoms, such as in the case of 1,4-butane diol, 1,6-hexanediol and triethylene ether glycol, have the polyborate structure:

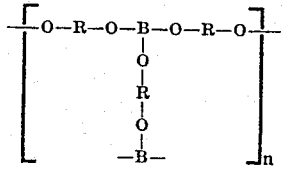

VII

These dihydric derivatives can be prepared by esterification of boric acid with a diol, e.g., ethylene glycol, propylene glycol, trimethylene glycol, 1,3-butanediol, etc., the diol being present in excess to insure a soluble product, and the byproduct water being removed by vacuum or by means of an azeotroping agent such as benzene or toluene. Using a stoichiometry of more than 1:1 diol to boric acid yields polymers containing a plurality, e.g., 4 to 7, glycol residues per molecule. Esterification also can be accomplished with boric oxide, or the diol can be used to transesterify to a higher alkyl borate ester.

Orthoborates of trihydric alcohols are also known and can be used in this invention, as well as partial esters of boric acid. Alkoxyboranes (RO)₂BH and ROBH₂, are also known and can be used.

As described above, the coordination compounds can be prepared by reacting the borate ester catalyst component with a base metal compound, the two components forming tetrahedral boron-oxygen coordination compounds or complexes. Such bases include alkali or alkaline earth metal (such as sodium, potassium, lithium, rubidium, and cesium) as well as the alcoholates, phenates, hydrides, carboxylic acid salts, and hydroxides thereof. Representative bases which can be used include sodium hydroxide, potassium hydroxide, sodium methoxide, sodium phenate, sodium acetate, sodium hydride, lithium hydride, rubidium hydroxide, and the like. The amount of base used can be a stoichiometric amount or an excess thereof, and generally the atom ratio of the base metal to the boron atom in the complex can vary from 2/1 to 1/2 or as low as 1/10, as long as the complex has activity.

Trialkoxy or triaryloxyboranes (RO)₃B, derived from monohydric alcohols or phenols, can coordinate with the nucleophilic basic metallic compounds, e.g., M—OR', to form a metal tetralkyl or tetraryl borate having the structure shown by formula I. Representative borate salts of this type include [(CH₃O)₄B]Na, [(CH₃O)₄B]Na, [(C₂H₅O)₄B]Na, [(C₃H₇O)₄B]Na, [(C₄H₉O)₄B]Na, [(C₅H₁₁O)₄B]Na, [(C₈H₁₇O)₄B]Na, [(C₆H₅O)₄B]Na, [(C₆H₅CH₂O)₄B]Na, [(C₂H₅O)₃BOCH₃]Na, [(C₁₈H₃₇O)₄B]Na, and the like, including the corresponding potassium, lithium, rubidium, and cesium salts.

The metal tetralkoxy or tetraryloxy borate coordination compounds can be obtained by reacting the trialkoxyborane or triaryloxyborane with a metal salt of the alcohol, generally in the presence of excess alcohol as solvent. These tetrahedral boron-oxygen compounds can also be formed by reacting the alkoxy borane with a metal hydride, such as sodium hydride, or by reacting the alcohol with a metal borohydride, such as sodium borohydride, these reactions being done neat or in the presence of excess alcohol or in the presence of a solvent. Representative coordination compounds of this type include

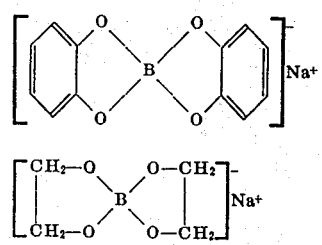

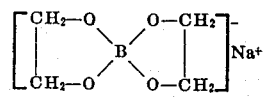

and the like, including the corresponding potassium, lithium, rubidium, and cesium salts.

The catalyst of this invention can be used in a 100 percent active form, though they generally are not soluble in the reaction mixture to be catalyzed, and thus will not be preferred for some uses. Alternatively, they can be used in a solvent in which the isocyanate or polyisocyanate-polyol reaction mixture is also soluble, but this is not desirable in that the solvent will usually have an effect on the properties of the resulting polymer product, unless removed therefrom, which also will be generally undesirable. The preferred method of making the catalyst of this invention is to make it in the presence of excess alcohol or phenol, e.g., 20 to 100 percent, preferably 30 to 50 percent, in excess of the stoichiometric amount, the resulting product being from 20 to 60 percent active, i.e., the product a 20 to 60 percent solution of borate salt in alcohol or phenol. Such a catalyst product will usually be soluble in the isocyanate or polyisocyanate-polyol reaction mixture. Instead of adding the catalyst to the reaction mixture to be polymerized, the polyol reactant, when used for example in the preparation of isocyanurate-modified polyurethanes or urethane-modified polyisocyanurates, can be converted in part to the desired borate ester and the "catalyzed" or partially esterified polyol, with the catalyst formed in situ therein, can be used as the polyol reactant in the preparation of such products.

The activity of the catalyst, that is, the rapidity at which it gels the reaction mixture, can vary and will be dependent on the particular alcohol used to make the borate ester as well as the relative M/B atom ratio in the catalyst material and the amount of the catalyst added to the reaction mixture. It generally will be desirable to choose as an alcohol, for formation of the borate ester, one which contributes or does not adversely materially affect the molecular weight of the resulting polymer product and one which will produce a borate ester which is relatively hydrolytically stable. The M/B atom ratio, e.g., Na/B atom ratio, generally will vary from 2/1 to 1/7, those with an M/B ratio of about 1/1 being preferred catalysts capable of readily gelling the reaction mixture upon being admixed therewith at ambient or room temperature. Such room temperature mixing will, of course, be generally desirable. In other cases, it may be desirable to have the catalyst active at elevated temperature, and thus catalysts which are capable of imparting a desirably long pot life to the reaction mixture or some degree of latentcy and activity at elevated temperatures will be applicable or preferred in some applications.

The trimerization of isocyanates, using the catalyst of this invention, can be carried out according to prior art manipulative techniques by admixing the isocyanate at room temperature, e.g., at 50° to 100° F., with the catalyst and allowing the trimerization to proceed at the autogeneous exothermic reaction temperature obtained upon said admixing, or at elevated temperatures, e.g., up to 200° C., to completion, or the trimerization can be interrupted or arrested to produce an isocyanurate product with free isocyanate functionality, and the product used as an NCO-prepolymer in preparing urethanes, such as disclosed in U.S. Pat. No. 3,280,066. The polymerization of polyisocyanate-polyol mixtures to form products with urethane and isocyanurate linkages can also be carried out by prior art manipulative techniques, generally involving similarly admixture of the reactants with the catalyst at low temperature or at elevated temperatures, e.g., 0° to 200° C., preferably 20° to 70° C. Conventional fillers, cocatalysts, cross-linking materials, and other common additives can be incorporated into the polyisocyanate-polyol reaction mixture to obtain products having desirable properties.

Generally, the catalytic activity, trimerization, or polymerization rate will vary, depending upon the particular catalyst used and the amount thereof, the nature of the reactants and the presence of other conventional materials, and the temperature of which polymerization is effected. The urethane-isocyanurate products can be made by the so-called "one-shot" method or can be carried out by the conventional two-step method in the case of foamed products, in which the polyol is first reacted with the polyisocyanate under anhydrous conditions to form a prepolymer, then water is added to form a foamed product or an inert gas is added as a blowing agent to supplement the gas formed by the reaction of water and —NCO groups. Or the inert gas can be used to provide all of the blowing (in which case the reaction mixture is maintained substantially anhydrous).

The isocyanate reactant materials used in this invention are known in the prior art (e.g., see U.S. Pat. No. 3,054,755) can be represented by the general formula $R(NCO)_n$, where R is aryl, alkyl, or cycloalkyl, and $n$ is 1 to 5. Preferred isocyanates are the aromatic isocyanates. Representative mono-isocyanates which can be trimerized to form isocyanurate compounds include phenyl isocyanate, benzylisocyanate, p-tolyl isocyanate, 1-naphthylisocyanate, n-propyl benzyl isocyanate, o-tolyl isocyanate, p-methoxyphenyl isocyanate, o-chlorophenyl isocyanate, p-nitrophenyl isocyanate, and p-phenylmethylene phenyl isocyanate. Polyisocyanates can also be polymerized or trimerized to form cross-linked polyisocyanurates, such polyisocyanates being trimerized per se with the catalyst of this invention or in admixture with a polyol. Representative polyisocyanates which can be used are aromatic polyisocyanates such as toluene diisocyanate, diphenylmethane diisocyanate and xylylene diisocyanate. Toluene diisocyanate, especially mixtures of the 2,4- and 2,6-isomers thereof, is particularly preferred in that it is readily reactive with the preferred polyols to give products having the desired properties, and is economically available commercially. Other suitable diisocyanates include m- or p-phenylene diisocyanate; 1,5-naphthalene diisocyanate; 4,4'-diphenylmethane diisocyanate; hexamethylene diisocyanate; 3,3'-dimethyl-4,4'-biphenylene diisocyanate; and dimer acid diisocyanate (DDI 1410, 36 carbon atoms, molecular weight 600). Other useful polyisocyanates include polyisocyanate compositions obtained by phosgenating the polyamines obtained by condensing formaldehyde with aromatic amines. Examples of polyisocyanates thus produced are the polymethylene polyphenyl isocyanates. A list of useful commercially available polyisocyanates is found in "Encyclopedia of Chemical Technology," Kirk-Othmer, 2nd Ed., Vol. 12, pp. 46–47, Interscience Pub., N.Y. (1967).

NCO-capped prepolymers can also be trimerized with the catalysts of this invention to produce urethane-modified polyisocyanurates. Such prepolymers can also be used in admixture with polyols and the mixture catalyzed to produce products with urethane and isocyanurate linkages. Such NCO-capped prepolymers are well known (see U.S. Pat. Nos. 3,073,802 and 3,054,755) and are generally prepared by reacting an excess of polyisocyanates, such as an aromatic diisocyanate, with polyalkylene ether glycols, or polyester glycols. Prepolymers are sold under the trademarks Multrathane and Adiprene. The isocyanate can also be used in the form of a blocked isocyanate.

The polyol component of the polyisocyanate-polyol reaction mixture is preferably a low molecular weight polyalkylene ether polyol, but may also be a low molecular weight nonpolymeric polyol, or a polyester or polyester amide containing reactive hydroxyl groups. The preferred polyols have a molecular weight between about 250 and 2,000. Polyols having a molecular weight up to about 5,000 are useful. Where a hard product is desired, the polyol preferably should have an average polyol or hydroxyl equivalent weight between about 130 and 400 (i.e., one active —OH group per 130 to 400 molecular weight of polymer). Where softer more rubbery products are desired, the polyol may have one reactive —OH group per 400 to 1,000 molecular weight of polymer. The rubbery products preferably should have a cross-link density of about 1 cross-link per 2,000 to 20,000 atomic weight units, while the more rigid products have a cross-link density of about 1 cross-link per 400 to 2,000 atomic weight units.

Examples of the preferred polyether polyols are polypropylene ether polyols or polybutylene ether polyols, such as the glycols represented by the formula $HO(RO)_nH$. Specifically the preferred polyalkylene ether polyols are condensates of ethylene, propylene, or butylene oxide with pentaerythritol, sorbitol, sucrose, methylglucosides, or low molecular weight polyols, such as propylene glycol, tri-, tetra-, penta-, hexa-methylene glycols, 1,3-butylene glycol, 1,3-(2 ethyl) hexane diol, 2,2,4-trimethyl-1,3-pentanediol, trimethylol propane, 1,2,6-hexane triol, or phenyl-diisopropanolamine. The low molecular weight polyols mentioned above can also be used, and preferably blended, with polymeric polyols as components in the reaction mixture.

Useful polyesters include castor oil, derivatives thereof, and those generally prepared by the esterification reaction of an organic dicarboxylic acid or anhydride with an alkylene oxide polyol. The preferred polyols are ethylene, propylene, and butylene oxide polyester polyols having two or more hydroxyl groups. The acid or anhydride may be selected from a wide variety of polybasic acids, such as malonic, succinic, glutaric, adipic, pimelic, sebacic, acids prepared by dimerization or trimerization of unsaturated 18 carbon fatty acids and others. The reactants are combined in molecular ratios to provide hydroxyl terminating groups on the polyester molecules. In the formation of these polyesters, it is quite common to provide mixtures of acids and anhydrides with mixtures of glycols and other polyols. The acid number may be controlled by methods known in the art, and is usually low, being under 5.

Generally, the polyol-polyisocyanate reaction mixtures cured with the catalyst of this invention can have NCO/OH equivalent ratios in the range of 1/1 to 12/1, and even higher, e.g., 20/1 to 40/1, preferably at least 1.2/1 since below the latter the product will contain unreacted or free hydroxyl groups (which have a plasticizing function) and will be a more flexible product. Products made from reaction mixtures having NCO/OH ratios of 1/1 to 1.2/1 can be characterized as isocyanurate-modified polyurethanes, the isocyanurate content generally being at least 1.0 wt. percent of the product. Those products made from reaction mixtures with NCO/OH ratios of 1.2/1 and greater, e.g., 3/1 to 12/1, can be characterized as urethane-modified polyisocyanurates, the isocyanurate content being generally at least 5.0 weight percent of the product. The preferred products are those which are highly cross-linked by reason of having 20 to 80 percent of the —NCO groups of the polyisocyanate reactant converted into isocyanurate linkages. In general, regardless of the NCO/OH ratio, the mixed polyisocyanurate-polyurethane products of this invention have an amount of isocyanurate linkage in the polymer backbone sufficient to provide a heat stable product, i.e., a product which retains 75 to 100 percent of its room temperature hardness when heated at elevated temperature, e.g., 1 hour at 300°–500° F.

The amount of catalyst used in polymerizing the isocyanate or polyol-polyisocyanate reaction mixtures of this invention will vary, depending on the particular catalyst reactant used, and the desired activity of the catalyst. Generally, the amount of catalyst to use will be less than 10 weight percent of the isocyanate reactant, and usually from 0.5 to 5 weight percent of the isocyanate. Functionally stated, the amount of catalyst to use will be that amount sufficient to catalyze the polymerization or trimerization of the reaction mixture at the desired temperature.

Where a higher cross-linked or chain-extended product is desired, the polyol-diisocyanate reaction mixture can include a conventional trifunctional isocyanate or a triol. The reaction mixture can also include modifying mono-isocyanates or alcohols such as 1,4-butane diol, butyl cellosolve, butyl carbitol, oleyl alcohol, etc., to impart special properties to the polymer product, such as the degree of final hardness.

Filled polymer products can be made by incorporating into the reaction mixtures a host of different powdered or finely divided fillers (e.g., 5 to 25 weight percent) such as clay, talc, rubbery granular aggregate, titanium dioxide, diatomaceous earth, glass microbubbles and the like. Glass spheroids, e.g., see copending application Ser. No. 747,951, are useful in making lightweight isocyanurate-modified polyurethane syntactic foamed articles which can be finished by sanding, as described in copending application, Ser. No. 618,035. Coreactant materials such as the diamines described in U.S. Pat. No. 3,248,454 and copending application Ser. No. 618,035, can be included in the polyol-polyisocyanate reaction mixture, e.g., to increase the viscosity or moldability thereof as well as to increase the hardness of the resulting product. Fire-retardant fillers, such as polyvinyl chloride and antimony or phosphorous compounds can also be incorporated into the reaction mixture. Foamed or porous products of this invention, such as those having urethane as well as isocyanurate linkages, can be made by incorporating a small amount of water and/or by blowing the reaction mixture with a blowing agent such as Freon 11 dichlorodifluromethane. Conventional foam stabilizing agents such as silicone oils or organo-silicones can also be incorporated into such reaction mixtures to obtain foamed products with controlled porosity. A particularly useful foam stabilizer that can be used is a perfluoroalkyl amine, such as those disclosed in U.S. Pat. No. 3,378,399. Cocatalysts which can be used in conjunction with the catalysts of this invention, particularly in making room temperature curable polyurethanes, include polyol soluble organic compounds and certain compounds of polyvalent metals, such as tin, lead, or mercury (see British Pat. No. 1,053,383). Examples of such cocatalysts are phenylmercuric acetate, phenylmercuric oleate, mercuric octoate, mercuric naphthenate, lead octoate, lead naphthenate, dibutyl tin dilaurate, dibutyl tin diacetate, and similar compounds.

The polymeric products of this invention will generally have relatively high heat resistance and hydrolytic stability. They can range from soft solids to hard plastics. Elastomeric or rubbery materials can also be prepared.

The rubber or elastomeric urethane-isocyanurate products of this invention can be used to provide paving surfaces, particularly such as those tracks used for athletic or sporting purposes, and as coatings to provide protective surfaces, for example as rainproof or water-resistant coatings for clothing. They can be used as laminating resins for sheets of glass fiber and as adhesives for bonding metal to metal, wood to wood, and metal to wood, and as potting compositions for insulating magnet coils or other electrical devices. The hydrolytic stability of the isocyanurate-urethane products of this invention means that they can be shaped in the form of articles that are subject to moisture contact during use or which come into contact with aqueous solvents or water, such as gaskets, seals, etc.

Objects and advantages of this invention are further illustrated by the following examples.

EXAMPLE 1

Preparation of Tetraalkoxyborate Catalysts

A flask, fitted with thermometer, stirrer, and water trap, was charged with 675 g. (4.5 moles) of triethylene glycol and 46.5 g. (0.75 mole) of powdered boric acid. The resulting mixture was heated to about 130° C. under vacuum until the evolution of byproduct water ceased. The reaction mixture was then cooled to about 60° C. and a total of 18 g. (0.75 mole) of small particles of metallic sodium was added in three equal portions. After all the sodium had been added, the reaction mixture was then heated to about 130° C. under vacuum, the byproduct hydrogen gas being removed, and the mixture then cooled. The tetraalkoxyborate ester reaction product, $[B(O-CH_2CH_2-O-CH_2CH_2-O-CH_2-CH_2-OH)_4]^-Na^+$ in excess triethylene glycol (1.5 moles), was an amber-colored liquid with a Na/B atom ratio of 1/1. This product is hereinafter referred to as catalyst A.

In another run, the same procedure described above was followed except that a lesser amount of sodium was used, the tetraborate ester salt product so prepared having a Na/B atom ratio of 4/7. This product is hereinafter referred to as catalyst B.

In another run, 4.5 moles of vacuum-dried triethylene glycol and 0.75 mole of boric acid were heated as described above. Ninety parts of the resulting borate ester product was heated at about 110° C. with 10 parts of sodium methoxide and the byproduct methanol distilled off under vacuum, the Na/B atom of the product being 1/1. This product is hereinafter referred to as catalyst C.

In another run, 2.3 moles of vacuum-dried triethylene glycol was reacted with 0.21 mole of sodium borohydride at 110°–130° C. under vacuum, the resulting borate tetraester having an equivalent Na/B atom ratio of 1/1. This produce is hereinafter referred to as catalyst D.

In another run, a catalyst was prepared like catalyst A above, except that 42 parts of potassium hydroxide was used instead of the 18 parts of sodium. This product, having a K/B ratio of 1/1, is hereinafter referred to as catalyst E.

In another run, 3.0 moles of vacuum-dried triethylene glycol was mixed with 0.25 mole of boron oxide and the mixture heated under vacuum at about 110° C. The resulting triester was reacted with 0.29 mole of particulate sodium metal, the resulting sodium tetraborate having a Na/B atom ratio of 4/7 and hereinafter referred to as catalyst F.

In another run, a catalyst was prepared like catalyst A, except that 18 parts of lithium hydroxide was used instead of the 18 parts of sodium metal, the resulting catalyst having an Li/B atom ratio of 1/1 and hereinafter referred to as catalyst G.

In another run, a catalyst was prepared like catalyst A above, except that 77 parts of rubidium hydroxide was used instead of the 18 parts of sodium metal, the resulting catalyst having an Rb/B atom ratio of 1/1 and hereinafter referred to as catalyst H.

EXAMPLE 2

Twenty-five parts of phenyl isocyanate dissolved in 25 parts of chloroform was mixed at room temperature with 1 part of catalyst D of example 1. A solid product resulted within 15 minutes and was confirmed by infrared analysis as triphenyl isocyanurate.

EXAMPLE 3

Twenty-five parts of toluene diisocyanate were mixed at room temperature with 1.5 parts of catalyst A of example 1. A very exothermic reaction insued resulting in a production of a friable foamed polyisocyanurate products.

EXAMPLE 4

One hundred parts of an NCO-capped prepolymer were mixed at room temperature with 0.5 part of catalyst E of example 1. A gelled, hard, urethane-modified polyisocyanurate product resulted within 15 min. This product had a Shore D hardness of 87 at room temperature, and had a Shore D hardness of 70 at 450° F. Said NCO-capped prepolymer used was one having a viscosity of 450–950 c.p.s. and an isocyanate number of 171–175, and was made by reacting 67 parts of toluene diisocyanate (Nacconate 80) with a mixture of 17.3 parts of one polypropylene ether glycol (2,000 mol wt.) and 16 parts of another lower molecular weight polypropylene ether glycol (200 mol wt.).

EXAMPLE 5

A sodium borate ester having the structure:

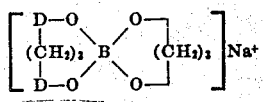

was prepared by adding 15.3 parts of powdered boric acid to 152 parts of 1,3-propane diol, the resulting mixture being heated to 70° C. under vacuum. Then, 3.3 parts of particulate sodium metal were added, the reaction mixture being maintained at 70°–90° C. until all the sodium had dissolved, this resulting catalyst having the above structure and a Na/B atom ratio of 4/7.

One gram of this catalyst is equivalent to 1.5 g. of catalyst A of example 1, in terms of the number of grams of boron per gram of catalytic material. Accordingly, these equivalent amounts of catalyst were each mixed at room temperature with 50 parts of the NCO-capped prepolymer described in example 4 and produced urethane-modified polyisocyanurate products in a very short time, i.e., in 75 sec. using the above-prepared catalyst and in 25 sec. using catalyst A.

EXAMPLE 6

In a first run, 40 parts of polypropylene ether triol (mol wt. 4,500) was mixed at room temperature with 60 parts of an NCO-capped prepolymer, and 0.4 part of lead octate. The NCO-capped prepolymer used had a viscosity of 1,840 c.p.s., an isocyanate number of 216, and was prepared by reacting 155 parts of methylenebis(phenylisocyanate) (Isonate 125) with a mixture of 23.75 parts of a polypropylene ether glycol having a mol wt. of 200 and 26 parts of a polypropylene ether glycol having a mol wt. of 2,000. The resulting product, produced by said mixing of this NCO-prepolymer with the polypropylene ether triol, was a chain-extended high molecular weight NCO-capped prepolymer. To the latter, 0.43 part of catalyst A of example 1 was added and mixed at room temperature, a hard, flexible, urethane-modified polyisocyanurate resin resulting within 15 min. This product had a Shore D hardness of 86 at room temperature and a Izod impact strength of about 2.5 ft. lb./in. of notch.

In a second run, 60 parts of the NCO-capped prepolymer described in example 4 was chain extended with 40.0 parts of the same polypropylene ether triol used in the above run. The resulting chain extended prepolymer was mixed with 3.2 parts of phenyl isocyanate and 0.5 part of catalyst E of example 1. The Izod impact strengths of samples of the resulting urethane-modified polyisocyanurate product aged at different temperatures were determined at various temperatures shown in table I below.

TABLE I

| Test temp., ° F. | Izod impact strength, ft. lbs./in, of sample aged at— | | |
|---|---|---|---|
| | Room temp. | 300° F. | 400° F. |
| Run No.: | | | |
| 1 | (¹) | 5.3 | 4.3 | 3.2 |
| 2 | 300 | 5.1 | 5.8 | |
| 3 | 400 | 3.1 | | 3.1 |

¹ Room temperature.

EXAMPLE 7

To 25 parts of the NCO-capped prepolymer described in example 6 was added at room temperature 0.05 parts of catalyst G of example 1. The resulting urethane-modified polyisocyanurate was a hard glossy resin that gelled in about 20 min. In a similar second run, using 1.0 parts of catalyst G, the mixture gelled in about 6 min. to again give a hard glossy product. The above products both had a Shore D hardness of about 85 when measured at room temperature. When the above products were heated to 400° F., in air, the resultant Shore D hardness values measured at 400° F. were 15 for the first run, and 72 for the second run.

In a similar run, using 0.5 parts of catalyst H, the material gelled to a hard resin in 8½ min. at 1.0 parts, 35 sec. and at 3.0 parts, 20 seconds. Room temperature Shore D hardness of the products was 87, Shore D hardness at 250° F. was 87 and Shore D hardness at 350° F. was 75.

In still another run, using 1.0 parts of catalyst H in 100 parts of the NCO-capped prepolymer described in example 4, a hard resin product resulted within 5 min. The room temperature Shore D hardness was 86; at 250° F. the Shore D hardness was 80; at 350° F. the Shore D hardness was 82; at 400° F. the Shore D hardness was 77; and finally measured at 450° F. the Shore D hardness was 76.

In repeat runs using 1.5 parts of catalyst H per 100 parts of said NCO-capped prepolymer, the Shore D hardness of the resulting products was essentially the same in the same temperature range, i.e., RT to 450° F.

In similar runs using the same catalyst ratios with other NCO-capped prepolymer as described in example 6, again the Shore D hardness values were in the range of 86 to 75 when measured from room temperature to 450° F.

EXAMPLE 8

In one run, 1 part of catalyst C of example 1 was mixed at room temperature with 25 parts of an NCO-capped prepolymer, the resulting mixture gelling within 5 to 10 min. to produce a urethane-modified polyisocyanurate. Said NCO-prepolymer that was used was prepared by reacting 86.7 parts of toluene diisocyanate (Nacconate 80) with a mixture of 6 parts of trimethylol propane-propylene oxide adduct with a mol wt. of 440 and 7.3 parts of trimethylol propane. This prepolymer had a viscosity of 3,200–5,000 c.p.s. and an NCO equivalent weight of 133–139.

In another run, 0.5 part of catalyst C and 0.5 part of just the borate ester (i.e., not the metal salt) were added at room temperature to 25 parts of said prepolymer; again the mixture gelled within 5 to 10 min. to produce a similar product. By way of comparison, when 0.3 part of just sodium methoxide was added to 25 parts of said prepolymer, there was no indication of gelling after 20 hr. or after 4 hr. upon heating at 150° F. Similar lack of gelation was observed when 1 part of just the borate ester (i.e., not the metal salt) was added to 25 parts of said prepolymer. These runs show that the borate ester per se or the base per se do not have catalytic activity unless both are used.

EXAMPLE 9

A mixture of 72.0 parts of a polypropylene ether glycol (400 mol wt.), 834.4 parts of a polypropylene ether glycol (2,000 mol wt.), and 107.6 parts of a polypropylene ether triol (750 mol wt.) was mixed with 9.0 parts of calcium octoate as a viscosity depressant and 900 parts of partially calcined clay filler (Huber Hi-white R); the resulting mixture is hereinafter referred to as Part A. Fifty parts of part A was mixed with 1.25 parts of catalyst B of example 1 and 0.05 part of lead octoate cocatalyst. The resulting mixture was mixed at room temperature with 6.75 parts (Part B) of the NCO-capped prepolymer described in example 4 to provide a reaction mixture having an NCO/OH equivalent mole ratio of 1.05/1.0. The reaction mixture of parts A and B and catalyst reacted exothermically and formed a rubbery isocyanurate-modified polyurethane product within about 15 min.

A second run was carried out in the same manner as that described above except that the catalyst added to part A was 0.5 part of a solution of 1 part of sodium oleate dissolved in 10 parts of catalyst B of example 1, and the relative amounts of parts A and B were such as to provide a reaction mixture having an NCO/OH equivalent mole ratio of 1.5/1.0. A solid rubbery isocyanurate-modified polyurethane product resulted within 15 min. after the addition of the NCO-capped prepolymer at room temperature. Samples (about 1.2 cm. thick) of this product were evaluated to determine the effect of temperature on the product's hardness by heating the product in air at elevated temperatures and in boiling water. The product, having a Shore A2 hardness of 51–56 as initially prepared, exhibited essentially no loss in hardness upon heating in air for 62 hr. at 200° F. (93° C.) and the same sample lost less than 10 percent of its initial hardness upon heating in air for 24 hr. at 250° F. (121° C.). At 300° F. (149° C.) it began to deteriorate and after 30–60 min. it had retained only about 48 percent of its initial hardness. Another sample of the product retained 85–90 percent of its initial hardness after being exposed for 2 hrs. in boiling water, the sample regaining about 96 percent of its initial hardness after drying in ambient air for 16 hrs. hr.

The above data show that the polyurethane product has significant heat resistance and hydrolytic stability. By way of comparison, a similar product made with phenyl mercuric acetate catalyst, instead of the sodium tetraborate ester, retained only about 10 percent of its initial hardness (Shore A2 of 42) when heated in air at 250° F. (121° C.) for 4 hours, and retained only about 28 percent of its initial hardness when heated for 2 hr. in boiling water, the latter sample regaining only about 67 percent of its initial hardness after drying in ambient air for 16 hr.

Another run, like the second run described above, was made using 75 parts of part A, 2 parts of catalyst C of example 1, 0.05 parts of sodium oleate, and 17.2 parts of part B. After 4 hr. at room temperature, no gelling of the reaction mixture was observed. At 180° F. (82° C.), a gelled rubbery isocyanurate-modified polyurethane product resulted within 15–30 min., this product having a Shore A2 hardness of 50. This run shows that some of the catalysts of this invention in some applications are relatively inactive at room temperature, and in that sense are latent and can be used where room temperature pot life is desired.

EXAMPLE 10

To 100 parts of a mixture of 220 parts of polypropylene ether triol with a mol wt. of 440 and 180 parts of a similar triol with a mol wt. of 740, there were added 42.5 parts of glass microbubbles (B4OB), 2.75 parts of Bentone-11 clay, and 1 part of sodium alumino silicate powder (Linde Molecular Sieve Type 4A). Then, 0.1 part of catalyst B of example 1 was added, and the resulting mixture called part A. Forty-nine parts (Part B) of the NCO-capped prepolymer described in example 8 were mixed with said part A at room temperature. The resulting mixture of parts A and B, with an NCO/OH ratio of 1.05/1.0, became solid within 15 min., in the form of isocyanurate-modified polyurethane syntactic foam. The increasing hardness of the product after adding Part B (prepolymer) to part A was measured as an indication of cure rate, as shown in table II below together with comparative cure rate data of a similar sample catalyzed with phenyl mercuric oleate.

TABLE II

| Time elapsed after adding Part B to Part A | Sodium tetraborate cat. | | Phenyl mercuric oleate cat. | |
|---|---|---|---|---|
| | Shore A2 hardness | Percent of ultimate hardness | Shore A2 hardness | Percent of ultimate hardness |
| 15 minutes | 60 | 80 | 10 | 14 |
| 30 minutes | 68 | 91 | 30 | 42 |
| 60 minutes | 70 | 93 | 40 | 56 |
| 90 minutes | 75 | 100 | 50 | 70 |
| 120 minutes | 75 | 100 | 50 | 70 |
| 48 hours | 75 | 100 | 65 | 90 |

The above-described polyurethane product prepared in accordance with this invention using the sodium tetraborate catalyst retained about 65 percent of its initial hardness after heating in air for 30–60 min. at 200° F. (93° C.). The product had an initial tensile strength of 2,100 p.s.i. (147 kg./cm.$^2$) and an elongation of 90 percent, and after exposure in boiling water for 6 hr. its tensile strength was 1,850 p.s.i. (129.5 kg. cm.$^2$) and its elongation was 120 percent. By way of comparison, when the same product was made with phenyl mercuric oleate, the product retained only 28 percent of its initial hardness of 72 Shore A2 when heated in air for 30–60 min. at 200° F. (93° C.), and though its initial tensile strength of 7,100 p.s.i. (497 kg. cm.$^2$) dropped to only 6,300 p.s.i. (441 kg./cm.$^2$) after 6 hr. in boiling water, its initial elongation of 3 percent did not change.

The toughness of the above-described product prepared with the sodium tetraborate catalyst, measured by multiplying the tensile strength by the elongation, was found to have an initial value of 189,000 increasing to 222,000 after exposure to boiling water. By way of comparison, the products made with phenyl mercuric oleate had an initial toughness of only 21,300 and decreased to 19,000 after exposure to boiling water.

EXAMPLE 11

A sodium borate ester catalyst with a Na/B atom ratio of 4/7 was prepared by adding 13.57 parts of $B_2O_3$ to 687.9 parts of polypropylene ether triol (mol wt. 435) and the resulting mixture heated to about 130° C. for 1 hr. under vacuum. Five grams of molecular sieves described in example 10 were added to dry the system and the 5.15 parts of particulate sodium metal added. The mixture was then heated for 2 to 3 hr. at about 110° C. until all the sodium had reacted, producing a tetraborate like catalyst A.

A polyol mixture of 100 parts of each of the two triols used in example 10 was mixed with 40 parts of glass microbubbles (B4OB) and 2 to 3 parts of said molecular sieves. The resulting mixture, Part A, was then mixed with 52 parts of the NCO-capped prepolymer, described in example 8, per 100 parts of part A or to give a mixture with an NCO/OH ratio of 1.05/1.0. Five 100-part samples of this mixture were each mixed with varying amounts of the above-prepared catalyst and the gel times noted in each case. Results are summarized in table III below for the resulting isocyanurate-modified polyurethane syntactic foam products

TABLE III

| Run | Amt. of catalyst used parts/100 parts of Part A | gel time, min. |
|---|---|---|
| 1 | 140 0.1 | |
| 2 | 0.5 | 16.5 |
| 3 | 1.0 | 11.0 |
| 4 | 2.5 | 1.0 |
| 5 | 5.0 | 1.0 |

These data show that the cure rate of the reaction mixture can be made faster with increasing amount of catalyst.

EXAMPLE 12

Twenty-five parts of a polypropylene ether glycol (2,000 mol wt.) was mixed with 0.5 part of the catalyst used in the second run of example 9 (sodium oleate dissolved in sodium tetraborate). To the resulting mixture, part A, 6.75 parts of the NCO-capped prepolymer described in example 4 was added and mixed at room temperature, the reaction mixture having an NCO/OH equivalent ratio of 1.5/1.0. A soft rubbery isocyanurate-modified polyurethane product resulted within 15 min. This example shows, inter alia, that cross-linked products can be made from a reaction mixture that has no added trifunctional cross-linker, such as a triol or triisocyanate.

EXAMPLE 13

Fifty parts of polypropylene ether glycol (2,000 mol wt.) was mixed with 0.5 part of catalyst B of example 1 and 0.1 part of lead octoate. The resulting mixture, part A, was then mixed at room temperature with 11.5 parts of the NCO-capped prepolymer described in example 4, the relative NCO/OH equivalent ratio in the resulting mixture being 1.3/1.0. A medium-hard, rubbery isocyanurate-modified polyurethane resulted within 6.5 min. after mixing. By way of comparison, in another run following the same procedure, except that the lead octoate was omitted, the product gelled only after 20 min. from the time the NCO-capped prepolymer was added to part A.

EXAMPLE 14

Twenty-five parts of a mixture of equal amounts of two polypropylene ether triols, one with 440 mol wt. and one with 740 mol wt., were mixed with 6 parts of catalyst D of example 1, 1 part of water, and 0.3 part of a perfluoroalkyl amine, $C_8F_{17}SON(C_2H_5)$ $(CH_2)_2NH(CH_2)_2NH(CH_2)_2NH_2$. The resulting mixture, part A, was then mixed at room temperature with 90 parts of the NCO-capped prepolymer described in example 4, the relative NCO/OH equivalent mole ratio of the reaction mixture being 2.1/1.0. A semirigid urethane-modified polyisocyanurate foam was produced within 15 min.

In another run the same procedure was repeated, except that 180 parts of the NCO-capped prepolymer was mixed with part A, the resulting mixture having an NCO/OH equivalent mole ratio of 4.2/1.0. A rigid urethane-modified polyisocyanurate foam resulting within 15 min.

EXAMPLE 15

Twenty-five parts of a mixture of equal amounts of the two polypropylene ether triols used in example 10 were mixed with 0.4 part of bis(2-dimethylaminoethyl)ether in dipropylene glycol (a tertiary amine product sold as NIAX Catalyst A-1), 0.45 part water, 4.00 parts of catalyst A of example 1, 0.1 part of lead octoate, 10.00 parts of a high molecular weight polyvinyl chloride (sold as PVC 71 AH, with an inherent viscosity of 1.30 and a specific viscosity of 0.057), and 8.9 parts of $Sb_2O_3$. Fifty parts of the resulting mixture, part A, was mixed with 250 parts of the NCO-capped prepolymer described in example 4 at room temperature, the resulting mixture having an NCO/OH equivalent ratio of 10/1. The mixture gelled within 15 min. to produce a rigid urethane-modified polyisocyanurate foam. This product had a density of 20–25 lb./ft.$^3$ and it was self-extinguishing, nailable, and machinable. These properties were essentially retained when the product was heated in air to 350° F. (176.7° C.).

A series of three runs was carried out following the procedure described above. In each run, part A was made up of 6.0 parts of polypropylene ether triol with a mol wt. of 440, 12.5 parts of a similar triol with a mol wt. of 740, 6.5 parts of catalyst D of example 1, 0.25 parts of Thancat DME tertiary amine, 0.2 part of the perfluoroalkyl amine used in example 14. The amount of the NCO-capped prepolymer, part B, varied in each run (30, 75 or 125 parts) to vary the NCO/OH ratio in the resulting mixtures. Table IV below summarizes the runs, together with certain physical properties that were determined on the resulting foamed products.

TABLE IV

|  | Run 1 | Run 2 | Run 3 |
| --- | --- | --- | --- |
| NCO/OH | 1.1/1.0 | 2.7/1.0 | 4.5/1.0 |
| Density of product g./cc. | 0.14 | 0.24 | 0.32 |
| Pressure (p.s.i.) to compress at 300° C. to: |  |  |  |
| 10% | 2 | 18 | 180 |
| 25 | 3 | 39 | 218 |
| 50 | 7 | 51 | 358 |

Another series of three runs was carried out in a similar manner as the above-described series, except that 0.3 part of THANCAT DME tertiary amine and 0.4 part water were used in each run. Certain physical properties of the resulting foamed polymer products of about 6–12 lb./ft.$^3$ density (0.095–0.20 g./cc.) were determined, this series of runs and results obtained are summarized below in table V.

TABLE V

|  | Run 4 | Run 5* | Run 6 |
| --- | --- | --- | --- |
| NCO/OH | 1.05/1.0 | 2.0/1.0 | 3.0/1.0 |
| Wt. % water absorption after 24 hrs. | 20 | 35 | 33 |
| Tensile strength, p.s.i. | 160 | 82 | 65 |
| Elongation, % | 70 | 7.5 | 3.5 |
| Pressure (p.s.i.) to compress to 50% at room temp. | 117 | 107 | 97 |
| Amt. of HCN evolved by pyrolysis at about 1,500° F., wt. % | 0.04 | 0.035 | 0.017 |

* In a repeat run, this sample had a tensile strength of 180 p.s.i., a tear strength of 23 lb./linear inch and the amount of pressure to compress the sample 50 percent at −67° F., 72° F., 200° F., and 300° F. was 350, 180, 30 and 3 p.s.i. respectively.

EXAMPLE 16

One hundred fifty parts of a hot melt was prepared from a mixture of 75 parts of Estane 5707–F1 (a solution grade urethane having a viscosity of 4,000–8,000 c.p.s.) and 75 parts of a polypropylene ether glycol (mol wt. 400). To this melt, there were added 6 parts of methylene chloride as a viscosity depressant and 2.4 parts of catalyst B of example 1. The resulting mixture, part A, was then mixed with 87.6 parts of an NCO-capped prepolymer to provide a mixture having an NCO/OH equivalent ratio of 1.2/1.0. Said prepolymer was prepared by reacting 62.3 parts of toluene diisocyanate with 31.4 parts of a polypropylene ether glycol (mol wt. 400) and 6.3 parts of a polypropylene ether triol (mol wt. 400). After mixing these materials together at room temperature, the product was degassed under a vacuum, then allowed to cure. A soft rubbery isocyanurate-modified polyurethane was obtained.

Two other runs were carried out in a similar fashion at higher NCO/OH ratios using in one run 100 parts of the hot melt and 73.2 parts of the NCO-capped prepolymer and using in the other run 100 parts of the hot melt and 97.4 parts of the NCO-capped prepolymer, to obtain soft rubbery polymers. The three above-described polymer products were then evaluated to determine their tensile strength and elongation at room temperature and after exposure to boiling water. In addition, another series of similar runs were made at various NCO/OH ratios using catalyst F of example 1 at a level of 1.6 parts per 100 parts of part A, and the properties of the resulting polymer products were similarly determine. Results are summarized below in table VI.

TABLE VI

| NCO/OH ratio of reaction mixture | Runs with catalyst B | | | Runs with catalyst F | | |
|---|---|---|---|---|---|---|
| | 1.2/1 | 1.5/1 | 2.0/1 | 1.2/1 | 1.5/1 | 2.0/1 |
| Tensile strength, p.s.i.: | | | | | | |
| At room temperature | 1,280 | 2,460 | 2,960 | 500 | 1,620 | 2,680 |
| After 1 hour in boiling H₂O | 690 | 1,320 | 1,930 | 470 | 1,060 | 2,590 |
| After 5.5 hours in boiling H₂O | 300 | 910 | 1,140 | 250 | 940 | 1,370 |
| Elongation, percent: | | | | | | |
| At room temperature | 330 | 200 | 110 | 410 | 180 | 70 |
| After 1 hour in boiling H₂O | 370 | 220 | 120 | 440 | 200 | 100 |
| After 5.5 hours in boiling H₂O | 410 | 280 | 170 | 560 | 250 | 130 |

The data of table VI show that the catalysts of this invention produce higher cross-linked products (with excellent elongation) from higher NCO/OH reaction mixtures, and that such products have excellent heat resistance and hydrolytic stability.

EXAMPLE 17

Fifty parts of hydroxylated castor oil (Polycin 99F) were mixed at room temperature with 0.75 part of catalyst B of example 1 and 38 parts of the NCO-capped prepolymer described in example 8. The NCO/OH equivalent ratio of the resulting mixture was 1.05/1.0. The reaction mixture gelled in 4.5 min. to form a hard rigid glassy isocyanurate-modified polyurethane. The above procedure was repeated using about twice as much of the NCO-capped prepolymer to obtain a reaction mixture having an NCO/OH equivalent mole ratio of 2.1/1.0. A similar hard product was obtained within 2.5 min. after mixing.

EXAMPLE 18

One part of $[BH(OCH_3)_3]^-Na^+$ was added to 273 parts of a vacuum-dried polypropylene ether glycol (mol wt. 400). The resulting mixture, in the amount of 24.5 parts, was then mixed at room temperature with 25.5 parts of the NCO-capped prepolymer described in example 16. The mixture (having an NCO/OH equivalent ratio of about 1.05/1.0) produced a gelled isocyanurate-modified polyurethane in 1.5 min., said product having a Shore A2 hardness of 75 and a melting point of 190°C.

EXAMPLE 19

A sodium bisdiolborate catalyst was prepared by dissolving 330 parts of catechol and 618 parts of boric acid in 400 parts of toluene and heating the mixture at reflux temperatures to azeotropically distill off 44 parts of water. To this solution 13.4 parts of powdered boric acid was added and the resulting mixture again heated at reflux temperatures to remove 10 further parts of water. The resulting solution, 736 parts, was divided into four equal portions, and a different amount of particulate sodium metal added to 3 of these portions and all 3 sodium-treated portions then heated at about 110°C. until all the sodium metal had reacted. Each of the resulting 4 portions were added to a polypropylene ether glycol (mol wt. 2,000) to provide about 2 parts of catalyst per 100 parts of glycol, and then a sufficient amount of the NCO-capped prepolymer described in example 8 was added to the glycol-catalyst mixture to provide in each case a mixture having an equivalent NCO/OH mole ratio of 1.05/1.0. The activity of each of the mixtures was noted, results being summarized in table VII.

TABLE VII

| Run No.: | Na/B of catalyst | Activity [1] |
|---|---|---|
| 1 | [2] None | None at room temperature. |
| 2 | 1/7 | Do. |
| 3 | 3/7 | Do. |
| 4 | 1/1 | Slight activity at room temperature; at 200° F., sample gelled to soft rubber in 5-10 minutes. |

[1] "Activity" means ability of catalyst to produce gel.
[2] Control.

EXAMPLE 20

Four hundred parts of polypropylene glycol (mol wt. 1,100) was vacuum dried at 130°C. for 1 hr. and then cooled to about 75°C. Then, 0.5 part of sodium borohydride in diglyme was added and the mixture (Na/B=1/1) heated at about 100°C. for about 3 hr. to remove byproduct hydrogen and the diglyme. Twenty parts of the resulting catalyzed polyol was mixed at room temperature with 15 parts of the NCO-capped prepolymer described in example 8 to provide a mixture having a NCO/OH equivalent ratio of 2.5/1.0. A hard, resinous urethane-modified polycyanurate product resulting within 15 sec.

In a similar run, using, instead of sodium borohydride, 3 parts of boric acid followed by 0.2 part of sodium hydride to obtain a Na/B atom ratio of 1.2/7, a gelled product was obtained within 75 sec. after adding the NCO-capped prepolymer to the catalyzed polyol. In another run, using, instead of the sodium borohydride, 3 parts of $B_2O_3$, followed by 0.2 part of sodium hydride to obtain an Na/B atom ratio of 0.7/7, a gelled product was obtained within 5.5 min. after adding the NCO-capped prepolymer to the modified polyol. And in still another similar run, using, instead of sodium borohydride, 3 parts of trimethyl borate followed by 0.2 to 0.5 part sodium hydride to obtain Na/B ratios of 2/7 to 5/7, a gelled product formed within 20 to 45 sec. (when the sodium hydride used was 0.3 to 0.5 part) and within 5 min. (when the sodium hydride used was 0.2 part). These runs show that the activity of the catalysts of this invention will vary, depending on the particular catalyst used.

EXAMPLE 21

A first catalyzed polyol (No. 1) was prepared by vacuum drying, at 130°C. for 1 hr., 400 parts of polypropylene ether glycol (mol wt. 1,100). After cooling to about 110°C., 0.5 part of sodium borohydride in diglyme was added, and the resulting mixture maintained at about 110°C. for 1½ hour. After cooling the reaction mixture (with a Na/B atom ratio of 1/1) to 60°C., 4 parts of the NCO-capped prepolymer described in example 4 were added to insure the absence of water, the mixture being held under vacuum for about 15 min. at 60°C.

A second catalyzed polyol (No. 2) with a Na/B atom ratio of 3/7 was prepared by adding 1.5 parts of powdered boric acid to 40 parts of said vacuum-dried polypropylene ether glycol and similarly treating the reaction mixture with 4 parts of said NCO-capped prepolymer to insure dehydration of the system. Then 0.2 part of particulate metallic sodium was added and the reaction mixture allowed to react for about 1 hr. under vacuum.

Fifteen parts of each of the above-prepared catalyzed polyols were mixed with 25 parts of the unreacted or free starting glycol, and the resulting mixtures were mixed with various amounts of said NCO-capped prepolymer. The Shore hardness of the resulting gelled products were determined. In addition, the hardness of products resulting from the admixture of the said first catalyzed polyol with varying amounts of said prepolymer were also determined. Results are summarized in table VIII.

TABLE VIII

| Run No. | Catalyzed polyol used, number | Amt. of catalyzed polyol used, parts | Amt. of free polyol used, parts | Amt. of prepolymer used, parts | NCO/OH ratio in reaction mixture | Shore hardness [1] |
|---|---|---|---|---|---|---|
| 1 | 1 | 40 | 0 | 25 | 2.1 | 69 (A2) |
| 2 | 1 | 40 | 0 | 30 | 2.5 | 80 (A2) |
| 3 | 1 | 40 | 0 | 35 | 2.9 | 88 (A2) |
| 4 | 1 | 15 | 25 | 15 | 1.25 | 40 (A2) |
| 5 | 1 | 15 | 25 | 20 | 1.65 | 56 (A2) |
| 6 | 1 | 15 | 25 | 40 | 3.3 | 40 (D) |
| 7 | 1 | 3.75 | 6.25 | 40 | 13.3 | 70 (D) |
| 8 | 2 | 15 | 25 | 15 | 1.25 | 35 (A2) |
| 9 | 2 | 15 | 25 | 20 | 1.65 | 58 (A2) |
| 10 | 2 | 15 | 25 | 40 | 3.3 | 45 (D) |
| 11 | 2 | 3.75 | 6.25 | 40 | 13.3 |  |

[1] "A2" is shore A2 hardness; "D" is Shore D hardness.

The data of table VI show that the higher the NCO/OH ratio of the reaction mixture, the more cross-linked will be the resulting product.

The products of run Nos. 1 and 2 pillowed when heated for 48 hrs. at 250° F., whereas that of run No. 3 remained unchanged when similarly heated, but pillowed when heated at 350° F. for 1½ hr.

EXAMPLE 22

Twenty parts of said first catalyzed polyol of example 21 was mixed at room temperature with 10 parts of dichloromethane blowing agent, 40 parts of the NCO-capped prepolymer described in example 4, and 5 parts of Nacconate 80 toluene diisocyanate. The resulting mixture foamed and produced a tack-free urethane-modified polyisocyanurate foam in 10 min. This product remained hard after heating 48 hr. at 250° F., 5 hr. after heating at 300° F., and 1 hr. after heating at 400° F. When the temperature was incrementally raised to 475° F. and maintained for about 20 min. at that temperature, oxidation and degradation was observed, but the product retained its shape.

EXAMPLE 23

One-half part of sodium borohydride was added to a mixture of polyols made of 200 parts of polypropylene ether glycol (mol wt. 270), 200 parts of polypropylene ether glycol (mol wt. 400), 90 parts of polypropylene ether glycol (mol wt. 700) and 10 parts of a polyol (Quadrol) prepared by condensing propylene and ethylene oxides with ethylene diamine. The resulting mixture was vacuum dried at 130° C. to remove byproduct hydrogen, and then cooled to 45° C. Further traces of moisture were removed by adding 4.8 parts of the NCO-capped prepolymer described in example 4 and the resulting mixture cooled. Twenty-five parts of the latter, part A, was mixed at room temperature with 20 parts of said NCO-capped prepolymer, the resulting mixture gelling to a isocyanurate-modified polyurethane product within 7 sec.

In a run similar to the above, 0.5 part of potassium borohydride was used instead of sodium borohydride. Also, a different NCO-capped prepolymer was used to insure dehydration of the catalyzed polyol base. (The dehydrating NCO-capped prepolymer used was prepared by reacting 129.5 parts of toluene diisocyanate (Nacconate 80) with 29.0 parts of dipropylene glycol, the resulting prepolymer having an NCO equivalent weight of 150 and a viscosity of about 1,100 c.p.s.) A solid resinous isocyanurate-modified polyurethane product was obtained within 3 min. after addition of the NCO-capped prepolymer reactant to the catalyzed polyol base.

EXAMPLE 24

In this example, three sodium tetraalkoxyborates were made and evaluated at different levels as catalysts for the preparation of polyurethanes.

The first catalyst (tetraborate with a Na/B atom ratio of 4/7) was prepared by adding 29 parts of $B_2O_3$ to a solution of 275 parts of triethylene glycol and 300 parts of toluene, removing the water of reaction, adding 11 parts of particulate metallic sodium, and heating the resulting mixture until all the sodium had reacted. In a similar manner, the second catalyst (a tetraborate with a Na/B atom ratio of 4/7) was made using 300 parts of triethylene glycol, 30.9 parts of powdered boric acid, 200 parts of toluene, 6.6 parts of metallic sodium. The third catalyst (a tetraborate with a Na/B atom ratio of 1/1) was similarly prepared by adding 18.9 parts of sodium borohydride to 300 parts of triethylene glycol in 20 parts of toluene.

Each of the catalysts was added at different levels to two different polypropylene ether glycols, and then a sufficient amount of the NCO-capped prepolymer described in example 4 was added and mixed at room temperature to obtain in each run a mixture with an NCO/OH mole equivalent of 1.05/1.0. In each run, gel times were noted, the results being summarized in table IX below.

TABLE IX

| Run No. | Cat. used, No. | Amt. of cat. parts per 100 parts of glycol | M.W. of ether glycol used | Gel time at rm. temp. |
|---|---|---|---|---|
| 1 | 1 | 0.1 | 450 | No gel in 1 hour. |
| 2 | 1 | 0.3 | 450 | 11.5 minutes. |
| 3 | 1 | 0.5 | 450 | 7.5 minutes. |
| 4 | 1 | 0.75 | 450 | 3.5 minutes. |
| 5 | 1 | 1.5 | 450 | 1 minute. |
| 6 | 2 | 0.1 | 450 | No gel in 1 hour. |
| 7 | 2 | 0.3 | 450 | 8.5 minutes. |
| 8 | 2 | 0.5 | 450 | 5 minutes. |
| 9 | 2 | 0.75 | 450 | 2.5 minutes. |
| 10 | 2 | 1.5 | 450 | 1 minute. |
| 11 | 3 | 0.1 | 450 | No gel in 1 hour. |
| 12 | 3 | 0.3 | 450 | Do. |
| 13 | 3 | 0.5 | 450 | 8.5 minutes. |
| 14 | 3 | 0.75 | 450 | 6 minutes. |
| 15 | 3 | 1.5 | 450 | 2 minutes. |
| 16 | 1 | 0.3 | 750 | No gel in 1 hour. |
| 17 | 1 | 0.5 | 750 | 8.25 minutes. |
| 18 | 1 | 0.75 | 750 | 7.25 minutes. |
| 19 | 1 | 1.0 | 750 | 6.25 minutes. |
| 20 | 1 | 2.0 | 750 | 2.0 minutes. |
| 21 | 2 | 0.3 | 750 | No gel in 1 hour. |
| 22 | 2 | 0.5 | 750 | 14 minutes. |
| 23 | 2 | 0.75 | 750 | 9 minutes. |
| 24 | 2 | 1.0 | 750 | 7 minutes. |
| 25 | 2 | 2.0 | 750 | 4.75 minutes. |
| 26 | 3 | 0.3 | 750 | No gel in 1 hour. |
| 27 | 3 | 0.5 | 750 | 24.5 minutes. |
| 28 | 3 | 0.75 | 750 | 13.5 minutes. |
| 29 | 3 | 1.0 | 750 | 15.5 minutes. |
| 30 | 3 | 2.0 | 750 | 15 minutes. |

The data of table IX show that the activity of the catalysts of this invention varies with the particular catalyst and polyol reactant used and with the amount of catalyst used.

EXAMPLE 25

A flask, fitted with a thermometer, stirrer and dry gas bleed, was charged with 1,000 parts of polypropylene ether triol (440 mol wt.) and vacuum dried at 30 mm. Hg pressure with dry gas bled at 100°–110° C. for 1 hr. To the dehydrated triol was added 8 parts of sodium borohydride and the dehydration conditions were maintained until the reaction of the $NaBH_4$ and glycol was complete. The resultant "catalyzed" polyol product was cooled and placed in closed glass container. This product had a Na/B ratio of 1/1.

In each of a plurality of runs, to 6.5 parts of the catalyzed polyol were added 6.0 parts of polypropylene ether triol (440 mol wt.), 12.5 parts of polypropylene ether glycol (740 mol wt.), 0.2 part of water, 0.25 part of THANCAT DME tertiary amine, and 0.25 part of a perfluoroalkylamine. Each composition was mixed well until all components were solubilized. Each composition was stirred at about 150°–200° F. to assist solubility of the surfactant in the polypropylene ether polyols.

After cooling each composition to room temperature, 50 parts of NCO-prepolymer described in example 4 was added to provide a reaction mixture having an NCO/OH ratio of 1.75/1 and the mixture was stirred until creamining was initiated. The cream material was poured into a container and in each run rigid isocyanurate-modified polyurethane foam was produced within 15 min.

The perfluoroalkyl amines used in the runs described above are listed in table X below, together with the foam quality of the resulting product in which they were used. The designation "good" foam quality means that the foam that was produced was stable and uniform and of the closed cell type, whereas a "poor" foam quality means that the pores of the foam were not uniform and the foam was weak and of higher density due to collapse of cells. Those perfluoroalkyl amines used in runs 1, 2 and 3 had the greatest lowering of the surface tension of the polyol used in the preparation of the foams. When using perfluoroalkyl amines, in order to get a good quality foam, the perfluoroalkyl amine should be readily solvated and dispersed

TABLE X

| Run | Perfluoroalkylamine | Foam quality |
|---|---|---|
| 1 | $C_8F_{17}SO_2N(C_2H_5)(CH_2)_2NH(CH_2)_2NH(CH_2)_2NH_2$ | Good |
| 2 | $C_8F_{17}SO_2NHC_2H_4NH_2$ | Do. |
| 3 |  | Do. |
| 4 | $C_7F_{15}CONHC_2H_4NHC_2H_4NH_2$ | Do. |
| 5 | $C_8F_{17}SO_2NHCH_2CH_2NH_2$ | Do. |
| 6 |  | Poor. |
| 7 | $C_8F_{17}SO_2NH(CH_2)_2NH(CH_2)_2NH(CH_2)_2NH_2$ | Do. |

Various modifications and alterations of this invention will become apparent to those skilled in the art without departing from the scope and spirit of this invention, and it should be understood that this invention is not to be unduly limited to the illustrative embodiment set forth herein.

I claim:

1. A process comprising mixing an isocyanate with a coordination compound of an organic borate ester and an alkali metal or alkaline earth metal, or a hydride, alcoholate, phenolate, carboxylic acid, or carbonate salt or hydroxide of said metal, and subjecting the resulting mixture to a temperature sufficient to form an isocyanurate product.

2. The process according to claim 1 wherein said isocyanate is mono-isocyanate.

3. The process according to claim 1 wherein said isocyanate is polyisocyanate.

4. The process according to claim 1 wherein said isocyanate is diisocyanate.

5. The process according to claim 1 wherein said isocyanate is isocyanate prepolymer.

6. The process according to claim 1 wherein said isocyanate is in admixture with polyol and is selected from the group consisting of polyisocyanate compounds and isocyanate prepolymers.

7. The process according to claim 1 wherein said temperature is ambient room temperature.

8. The process according to claim 1 wherein said ester is an orthoborate of a monohydric or polyhydric alcohol or phenol and said metal is sodium or potassium.

9. The process according to claim 1 wherein said catalyst is a coordination compound of the formula $$[B(OR)_4]^- M^+$$

where R is alkyl, hydroxy-substituted alkyl, ether-substituted alkyl, or alkyl substituted with ether and hydroxy substituents, and M is a cation of sodium, potassium, lithium, or rubidium.

10. The process according to claim 1 wherein said catalyst has the formula $$[B(O-CH_2CH_2-O-CH_2CH_2-O-CH_2CH_2-OH)_4] Na^+$$

11. The process according to claim 1, wherein said isocyanate is an isocyanate-capped prepolymer formed by reacting an excess of an aromatic diisocyanate with polyalkylene ether glycol, and said mixture further comprises polyalkylene ether polyol.

12. The process according to claim 11, wherein said mixture further comprises a blowing agent.

13. The process according to claim 11, wherein said mixture further comprises a filler.

14. The process according to claim 11, wherein said mixture further comprises a perfluoroalkyl amine as a foam stabilizer.

15. The process of claim 14, wherein said perfluoroalkyl amine is selected from the group consisting of $C_8F_{17}SO_2N(C_2H_5)(CH_2)_2NH(CH_2)_2NH(CH_2)_2NH_2$
$C_8F_{17}SO_2NHC_2H_4NH_2$

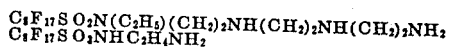

$C_7F_{15}CONHC_2H_4NHC_2H_4NH_2$
$C_8F_{17}SO_2NHCH_2CH_2NH_2$

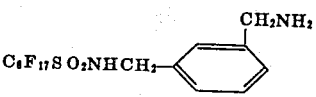

$C_8F_{17}SO_2NH(CH_2)_2NH(CH_2)_2NH(CH_2)_2NH_2$

16. The process according to claim 11, wherein the equivalent NCO/OH ratio of said mixture is 1/1 to 12/1.

17. A process comprising reacting a mixture of a polyalkylene ether polyol and an NCO-capped prepolymer with a catalytic amount of sodium tetraborate of triethylene ether glycol to produce a polymer having urethane and isocyanurate linkages, said mixture having an NCO/OH equivalent ratio of 1.2/1 to 12/1, said tetraborate having an Na/B atom ratio of 1/1.

18. A mixture comprising a polyalkylene ether polyol and an NCO-capped prepolymer with a catalytic amount of sodium tetraborate of triethylene ether glycol, said mixture having an equivalent NCO/OH ratio of 1.2/1 to 12/1, said tetraborate having an Na/B atom ratio of 1/1.

19. A method of forming a polyurethane polymer by reacting an organic polyhydroxy compound and organic polyisocyanate with one another which comprises carrying out the reaction in the presence of an alkali metal compound of boron complexed with a polyoxyalkylene polyol.

20. A catalyst-cured, highly cross-linked polymer of (1) isocyanate consisting essentially of polyisocyanate comprising isocyanate-capped prepolymer of polyalkylene ether polyol or polyester polyol and (2) polyol comprising polyalkylene ether polyol having a molecular weight between about 400 and 5,000, the NCO/OH equivalent ratio of said polyisocyanate and polyol being 1.2/1 to 12/1, said polymer having isocyanate-derived linkages consisting essentially of urethane and isocyanurate linkages.

21. The polymer of claim 19 in the form of a rigid or flexible foam.

22. A process for making a foamed product, comprising reacting polyoxypropylene polyol and an isocyanate prepolymer based on polyoxypropylene polyol in the presence of a blowing agent, a catalyst comprising a coordination compound of sodium or potassium and a boric acid ester of triethylene ether glycol, said catalyst having a sodium or potassium to boron atom ratio of 2/1 to 1/2, and $C_8F_{17}SO_2N(C_2H_5)(CH_2)_2NH(CH_2)_2NH(CH_2)_2NH_2$, the relative amounts of said polyoxypropylene polyol and isocyanate prepolymer reacted being sufficient to provide an NCO/OH equivalent mole ratio in the range of 3/1 to 12/1.

23. A process comprising mixing an isocyanate with [B(O—CH$_2$CH$_2$—O—CH$_2$CH$_2$—O—CH$_2$CH$_2$OH)$_4$]$^-$Na$^+$, and subjecting the resulting mixture to a temperature sufficient to form an isocyanurate product, said isocyanate being selected from the group consisting of phenyl isocyanate, toluene diisocyanate, and NCO-capped prepolymer.

24. The process according to claim 23 wherein said isocyanate is phenyl isocyanate.

25. The process according to claim 23 wherein said isocyanate is toluene diisocyanate.

26. The process according to claim 23 wherein said isocyanate is an NCO-capped prepolymer.

* * * * *

UNITED STATES PATENT OFFICE
CERTIFICATE OF CORRECTION

Patent No. 3,635,848     Dated January 18, 1972

Inventor(s) George M. Rambosek

It is certified that error appears in the above-identified patent and that said Letters Patent are hereby corrected as shown below:

Column 8, line 57, "produce" should read -- product --.

Column 9, lines 35-39, the formula should read

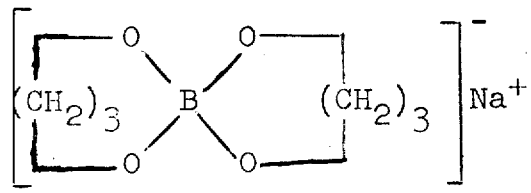

Column 12, in Table III the gel time, min. for Run 1 is "140".

Column 13, line 39, the formula should read

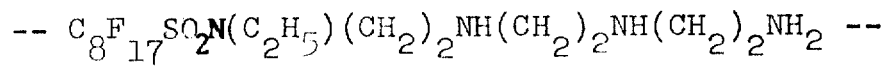

Column 20, claim 21 should read -- The polymer of claim 20 in the form of a rigid or flexible foam --.

Signed and sealed this 3rd day of October 1972.

(SEAL)
Attest:

EDWARD M. FLETCHER, JR.
Attesting Officer

ROBERT GOTTSCHALK
Commissioner of Patents